(12) United States Patent
Hunger

(10) Patent No.: US 7,346,992 B2
(45) Date of Patent: Mar. 25, 2008

(54) HAND-HELD POWER TOOL WITH ANGLE DRIVE

(75) Inventor: Josef Hunger, Fuchstal (DE)

(73) Assignee: Hilti Aktiengesellschaft, Shaan (LI)

( * ) Notice: Subject to any disclaimer, the term of this patent is extended or adjusted under 35 U.S.C. 154(b) by 0 days.

(21) Appl. No.: 11/511,826

(22) Filed: Aug. 28, 2006

(65) Prior Publication Data

US 2007/0068299 A1  Mar. 29, 2007

(30) Foreign Application Priority Data

Sep. 5, 2005  (DE) .................. 10 2005 000 111

(51) Int. Cl.
*B27B 9/00*  (2006.01)
(52) U.S. Cl. .................. 30/388; 30/276; 30/390; 74/411; 74/417; 74/424.5
(58) Field of Classification Search .................. 30/97, 30/206, 264, 276, 388, 389, 390, 391; 74/409, 74/411, 416, 417, 424.5
See application file for complete search history.

(56) References Cited

U.S. PATENT DOCUMENTS

| | | | | |
|---|---|---|---|---|
| 2,582,336 A | * | 1/1952 | Koza | 74/416 |
| 2,604,795 A | * | 7/1952 | Ristow | 74/417 |
| 2,925,104 A | * | 2/1960 | Allemann | 30/376 |
| 3,667,310 A | * | 6/1972 | Hahner | 74/417 |
| 3,817,115 A | * | 6/1974 | Schnizler et al. | 74/417 |
| 4,580,460 A | * | 4/1986 | Chang et al. | 74/409 |
| 5,012,582 A | * | 5/1991 | Bristol et al. | 30/391 |
| 5,103,561 A | * | 4/1992 | Harada et al. | 30/276 |
| 5,363,723 A | * | 11/1994 | Hoffman | 74/606 R |
| 5,829,306 A | * | 11/1998 | Komazaki et al. | 74/411 |
| 6,308,588 B1 | * | 10/2001 | Zubik | 74/417 |
| 6,558,394 B2 | * | 5/2003 | Lee | 606/105.5 |
| 2005/0044728 A1 | * | 3/2005 | Baker | 30/390 |
| 2005/0097760 A1 | * | 5/2005 | McDonnell | 30/388 |
| 2006/0219036 A1 | * | 10/2006 | Michioka et al. | 74/411 |

FOREIGN PATENT DOCUMENTS

DE  295 01 974 U1 * 6/1996

* cited by examiner

*Primary Examiner*—Hwei-Siu C. Payer
(74) *Attorney, Agent, or Firm*—Abelman, Frayne & Schwab

(57) ABSTRACT

A hand-held power tool (2) includes an angle drive (20) for connecting the motor-driven driving shaft (6) and the driven shaft (10) connected with a tooth holder (24) for joint rotation therewith, and having drive toothing (14) provided on the drive shaft (6) and driven toothing (16) provided on the driven shaft and cooperating with the drive toothing (14) for driving the driven shaft (10) in the driven direction ($D_{Ab}$) in response to the drive shaft (6) being driven in the drive direction ($D_{An}$), with the driven toothing (16) being inclined over its circumference (36) in a direction opposite the driven direction ($D_{Ab}$), and with the driven shaft (10) having an axial stop (30) for limiting an axial displacement backlash of the drive shaft (6) relative to the driven shaft (10).

9 Claims, 3 Drawing Sheets

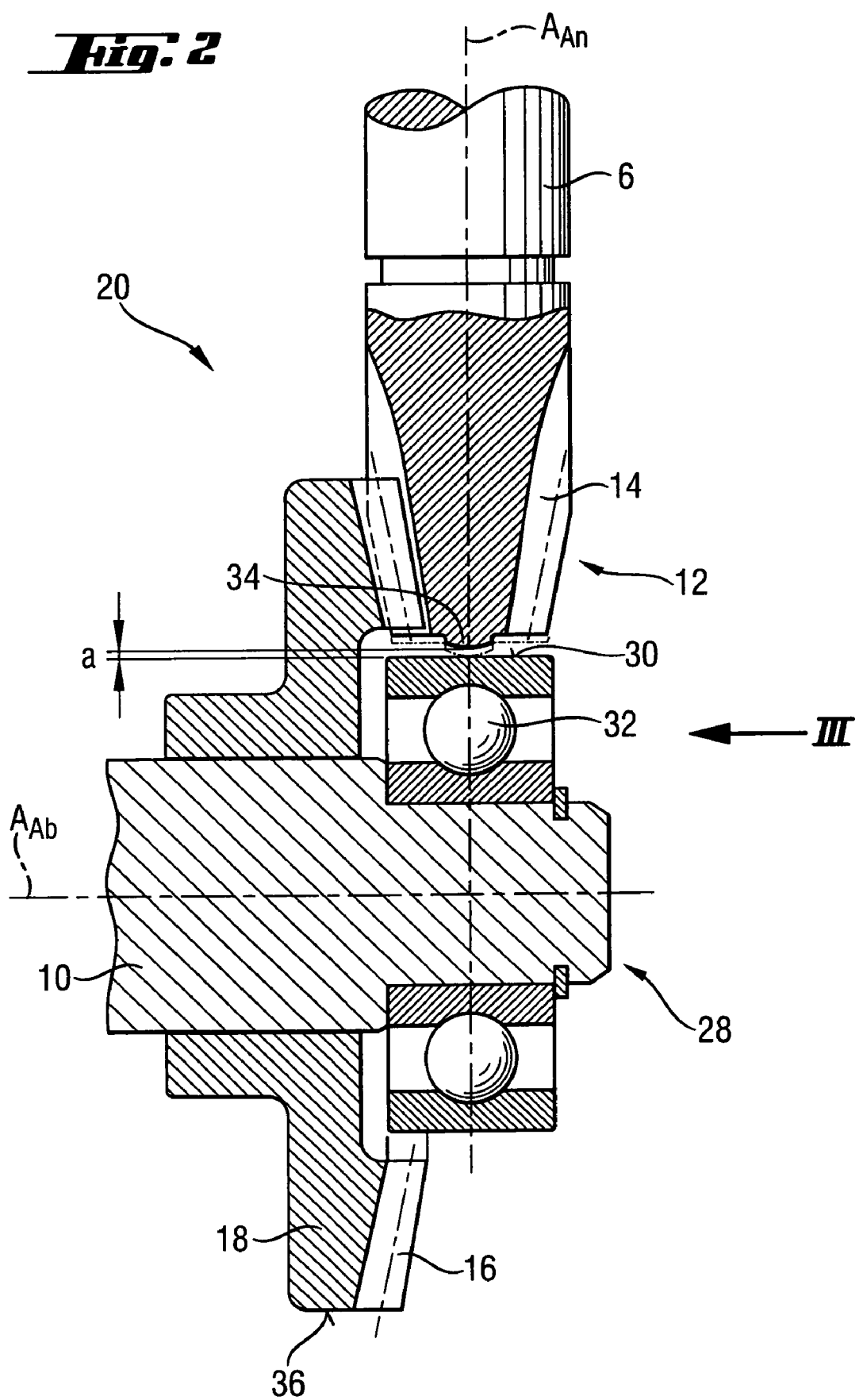

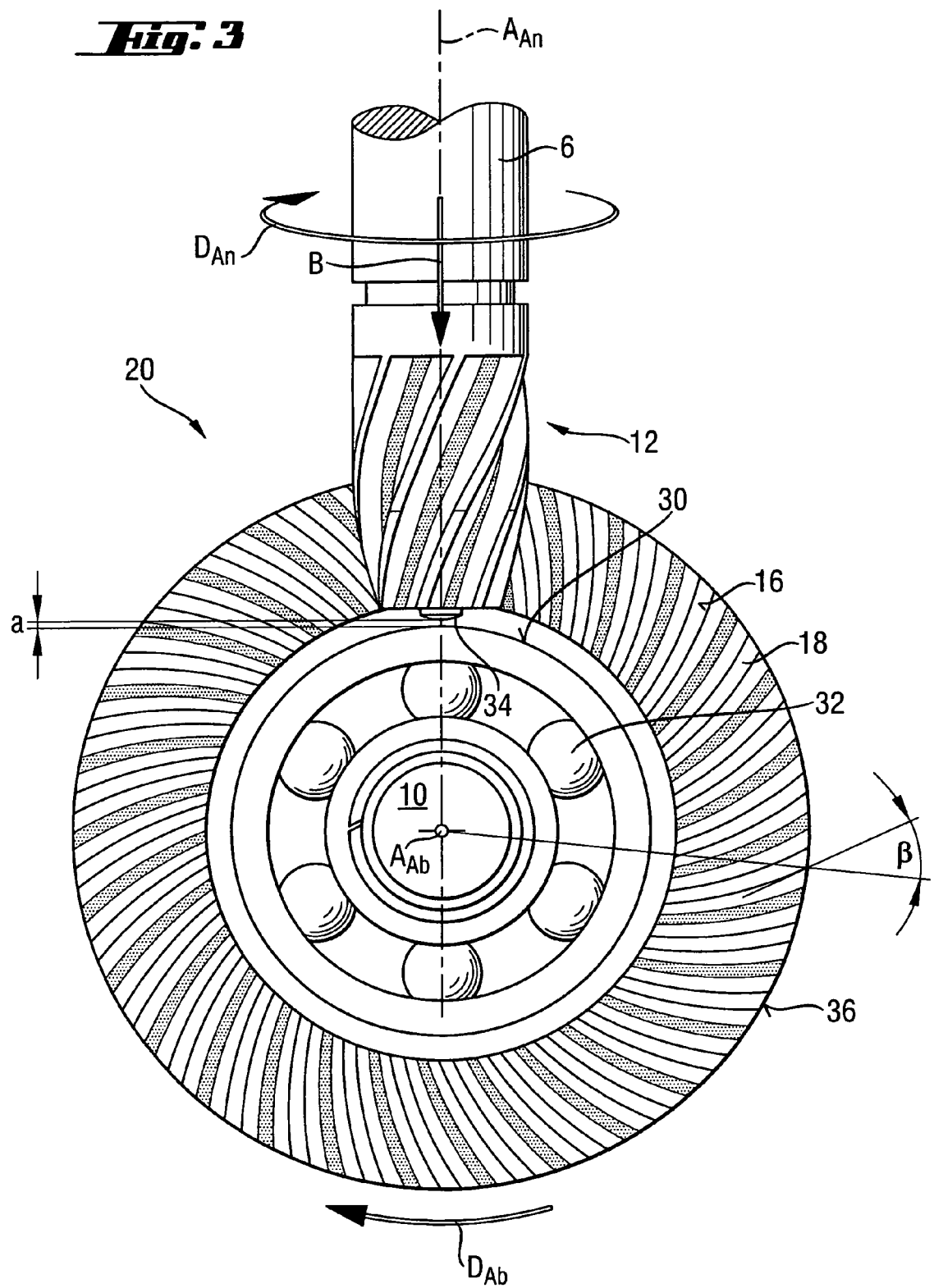

HAND-HELD POWER TOOL WITH ANGLE DRIVE

BACKGROUND OF THE INVENTION

1. Field of the Invention

The present invention relates to an electrically driven hand-held power tool with an angle drive such as angular grinder, drilling, chiseling, or screw-driving tool, or, in particular, a circular saw.

2. Description of the Prior Art

An angle drive of hand-held power tools of the type described above includes a drive toothing provided on a drive shaft driven by a motor in a preferable drive direction about a drive axis, and a driven toothing provided on a driven shaft which is driven in a preferable driven direction about a driven axis and is connected with a tool holder for the working tool. The driven toothing cooperates with the drive toothing for driving the driven shaft in the preferable drive direction in response to the drive shaft being driven in the preferable drive direction.

The advantage of hand-held tools with angular drives consists in that the drive axis can be arranged at an angle, in particular, a right angle to the driven axis. This makes possible a particularly compact design of the hand-held power tools.

German Publication DE 295 01 974 discloses an electrical hand-held power tool with an angle drive and in which the drive shaft is supported by a roller bearing that is supported at its side remote from the driven shaft in an axial direction against a support wall. The toothings of the angle drive are so formed that the drive shaft, upon application of an increased resistive torque to the driven shaft, as it is common during the start of the operation of a hand-held power tool, is accelerated in a direction away from the driven shaft and can be supported, via the roller bearing, against the support wall. Thereby, an axial displacement backlash of the drive toothing relative to the driven toothing can be reduced.

The limitation of the displacement backlash permits to eliminate a zero backlash between the toothings of the angle drive and the resulting increased wear or possible damage.

The drawback of the power tool of DE 295 01 974 consists in that the axial support is provided with the roller bearing. This is, in particular, because with high-power hand-held power tools, particularly high torque peaks are generated and, therefore, particularly expensive roller bearings are necessary in order to ensure a satisfactory limitation of the axial backlash. This results in high manufacturing costs and increase in weight. There is also the danger of increased hammering of the roller bearing with time which would lead to increased axial displacement backlash with time. This could lead to increased wear or damage of the angle drive.

Accordingly, an object of the present invention is to provide a hand-held power tool in which the drawbacks of the known prior art hand-held power tool are eliminated.

Another object of the present invention is to provide a hand-held power tool which would ensure a lasting limitation of the axial displacement backlash of the drive toothing relative to the driven toothing.

SUMMARY OF THE INVENTION

These and other objects of the present invention, which will become apparent hereinafter, are achieved by providing a hand-held power tool in which the driven toothing is inclined over its circumference in a direction opposite the driven direction and the driven shaft has an axial stop for limiting an axial displacement backlash of the drive shaft relative to the driven shaft.

According to the invention, the drive and driven toothings so cooperate with each other that with an increased resistive torque being applied to the tool holder, the drive toothing is pressed by the driven toothing in the direction of the driven shaft. However, the resulting axial displacement of the drive shaft is limited by the axial stop on the driven shaft to a predetermined amount. The axial stop can be formed by the driven shaft itself or by a stop element provided thereon. Thereby, a minimal backlash between engaging each others teeth flanks can be ensured. Preferably, the minimal backlash on the outer diameter of the driven toothing should not decrease below 0.05 mm. The minimal backlash can so limit the stresses which are produced between the drive and the driven toothings during the operation of the tool, that no increased wear occurs.

Advantageously, the driven toothing has, on its outer circumference, an inclination angle of from 10° to 30°, preferably, from 15° to 25°. With such an inclination angle, the drive toothing is displaced particularly well by the driven toothing.

Advantageously, the angle drive is formed as a helical conical gear drive. Such a drive ensures a high degree of quietness during the transmission of large torques.

According to a particularly advantageous embodiment of the present invention, the distance between the drive shaft and the stop amounts to from 0.05 mm to 0.15 mm when the motor is turned off. Thereby, a minimal backlash of 0.05 mm can reliably be obtained with conventional angle drives of hand-held power tools.

Advantageously, the stop is formed by a ring member secured on the driven shaft. Thereby, the stop can be formed of a harder material relative to the driven shaft to prevent wear of the stop region and thereby to ensure an axial displacement backlash as uniform as possible during the service life of the angle drive.

Preferably, the ring member is formed by the outer ring of a roller bearing that supports the driven shaft. Thereby, a relative movement between the stop and the drive shaft is prevented when the drive shaft contacts the stop in order to limit the axial displacement backlash. This permits the elimination of wear in the stop region to the most possible extent which ensures a substantial constant axial displacement backlash during the service life of the angle drive.

Advantageously, the drive shaft has, at its end adjacent to the driven shaft a bearing peg having relative to the drive shaft a reduced cross-section. Thereby, the region of the drive shaft that engages the axial stop can be more easily refurbished. This permits to precisely establish a desired distance to the driven shaft during assembly despite the manufacturing tolerances.

Furthermore, the drive axis extends advantageously perpendicular to the driven axis. This ensures a uniform positioning of the drive shaft when it contacts the axial stop.

The novel features of the present invention, which are considered as characteristic for the invention, are set forth in the appended claims. The invention itself, however, both as to its construction and its mode of operation, together with additional advantages and objects thereof, will be best understood from the following detailed description of the preferred embodiment when read with reference to the accompanying drawings.

BRIEF DESCRIPTION OF THE DRAWINGS

The drawings show:

FIG. 2 a cross-sectional view of the angular drive of the motor-gear drive arrangement shown in FIG. 1; and FIG. 3 a view of the angle drive shown in FIG. 2 in the direction of arrow III in FIG. 2.

DETAILED DESCRIPTION OF THE PREFERRED EMBODIMENTS

Figure 1:
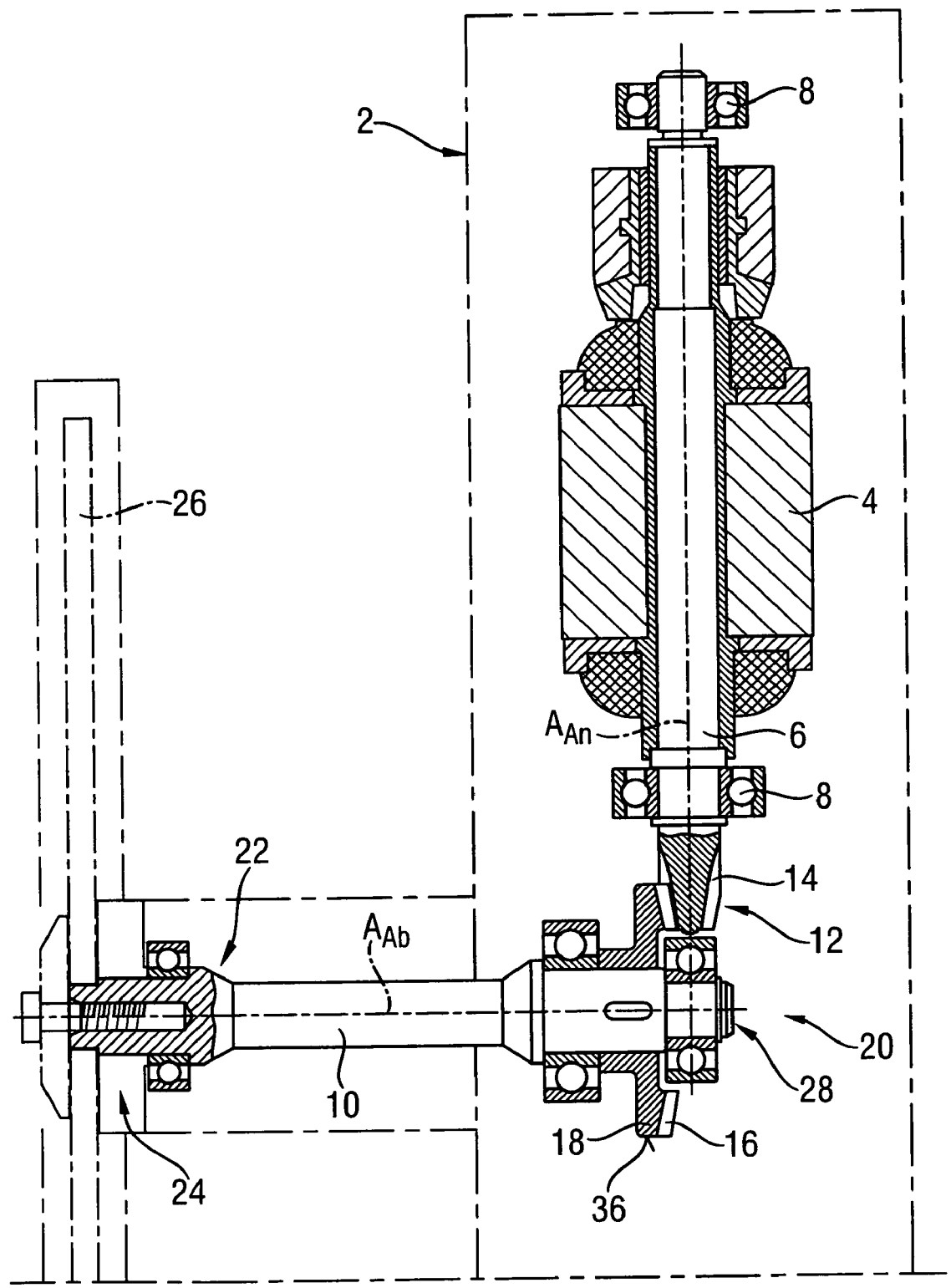
FIG. 1 a cross-sectional view of a motor-gear drive arrangement of a hand-held power tool according to the present invention.

A hand-held power tool 2 according to the present invention which is shown in FIG. 1, is formed as a circular saw having an electric motor 4 for driving a drive shaft 6. The drive shaft 6 is supported in two roller bearings 8 for rotation about a drive axis $A_{An}$.

At its end 12 adjacent to a driven shaft 10, the drive shaft 6 has a drive toothing 14 that cooperates with a driven toothing 16 of the driven shaft 10. The driven toothing 16 is provided on a conical gear 18 which is mounted on the driven shaft 10 with a press fit. Thereby, the driven shaft 10 is driven upon rotation of the drive shaft 6, with the driven shaft 10 being rotatable about the driven axis $A_{Ab}$. The drive axis $A_{An}$ and the driven axis $A_{Ab}$ extend perpendicular to each other, thereby forming an angle drive designated generally with a reference numeral 20.

As shown in FIG. 1 at an end 22 of the driven shaft 10 remote from the angle drive 20 there is provided a working tool holder 24. On the tool holder 24, a working tool 26 in form of a saw blade can be secured, as it is shown with dash-dot lines. With the tool holder 24 being directly mounted on the driven shaft 10, the driven toothing 16 becomes connected with the tool holder 24 for joint rotation therewith. Thus, with the electric motor being actuated, the drive shaft 6 drives, via the drive toothing 14 and the driven toothing 16, the driven shaft 10, and the tool holder 24 with the working tool 26 secured thereon.

In FIG. 2, the angle drive 20 is shown at an increased, in comparison with FIG. 1, scale. As shown in FIG. 2, on a drive-side end 28 of the driven shaft 10, in addition to the conical gear 18, a roller bearing 32 is mounted, also with a press fit. An outer ring of the bearing 32 serves as an axial stop 30 for the drive shaft 6. The roller bearing 32 is arranged along the drive axis $A_{An}$.

At the drive-side end 12 of the drive shaft 6 there is provided a bearing peg 34 likewise arranged along the drive axis $A_{An}$. The bearing peg 34 has a reduced cross-section in comparison with the drive shaft 6 and is engageable with the axial stop 30 as shown with a dash-dot line.

In a non-loaded condition shown in FIG. 2, the bearing peg 34 of the drive shaft 6 is spaced from the axial stop 30 by a distance a, preferably from 0.05 mm to 0.15 mm. This distance corresponds to the axial displacement backlash of the drive shaft 6 relative to the driven shaft 10.

FIG. 3 shows cooperating drive toothing 14 and driven toothing 16 of the angle drive 20. FIG. 3 also shows a preferable driving rotational direction $D_{An}$ of the drive shaft 6 and a resulting preferable driven rotational direction $D_{Ab}$ of the driven shaft 10.

As shown in FIG. 3, the angle drive 20 is formed as a spiral conical gear drive. The drive toothing 14 and the driven toothing 16 can have, e.g., spiral teeth, involute parabolic teeth, or cirarc teeth. Alternatively, the angle drive 20 can be formed as a helical conical gear drive. In each case, the driven toothing 16 would have, over an outer circumference 36, a helix angle β in a range from 10° to 30°. A particular good operational behavior is achieved with the helix angle β in a range from 15° to 25°. The tooth flanks on the outer circumference 36 are inclined in a direction opposite the driven rotational direction $D_{Ab}$. The drive toothing 14 has a corresponding tooth geometry.

When during an operation of the hand-held power tool 2, an increased resistive torque is applied to the working tool 26 e g., when the working tool 26 penetrates in a material, not shown, the applied resistive torque acts via the driven shaft 10 on the driven toothing 16 of the conical gear 18. As a result of increased resistance, the drive toothing 14, which is driven only by the motor 4, is so pressed by the inclined driven toothing 16 that the drive shaft 6 is displaced in direction B toward the driven shaft 10. After being displaced by a distance a which corresponds to the displacement backlash, the bearing peg 34 engages the axial stop 30, as shown in FIG. 2. With the resistive torque applied to the working tool 26 being increased further, no axial displacement of the drive toothing 14 relative to the driven toothing 16 takes place.

In this way, for each operational condition, on the outer circumference of the conical gear 18, not shown in detail, a tooth flank clearance of at least 0.05 mm is ensured between the drive toothing 14 and the driven toothing 16.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A hand-held power tool (2), comprising:
a drive shaft (6);
a motor (4) for driving the drive shaft (6) in a driving direction ($D_{An}$) about a drive axis ($A_{An}$);
a driven shaft (10) driven in a driven direction ($D_{Ab}$) about a driven axis ($A_{Ab}$);
a tool holder (24) connected with the driven shaft (10) for joint rotation therewith; and
an angle drive (20) for connecting the drive shaft (6) and the driven shaft (10) and having drive toothing (14) provided on the drive shaft (6) and driven toothing (16) provided on the driven shaft and cooperating with the drive toothing (14) for driving the driven shaft (10) in the driven direction ($D_{Ab}$) in response to the drive shaft (6) being driven in the direction ($D_{An}$), the driven toothing (16) being inclined over a circumference (36) thereof in a direction opposite the driven direction ($D_{Ab}$), and the driven shaft (10) having an axial stop (30) for limiting an axial displacement backlash of the drive shaft (6) relative to the driven shaft (10).

2. A hand-held power tool according to claim 1, wherein the driven toothing (16) forms an inclination angle (β) over the circumference (36) thereof from 10° to 30°.

3. A hand-held power tool according to claim 2, wherein the inclination angle (β) of the driven toothing (16) amounts to 15° to 25°.

4. A hand-held power tool according to claim 1, wherein the angle drive (20) is formed as a helical conical gear drive.

5. A hand-held power tool according to claim 1, wherein a distance between the drive shaft (6) and the axial stop (30) amounts, with the motor (4) being turned off, to from 0.05 mm to 0.15 mm.

6. A hand-held power tool according to claim 1, wherein the axial stop (30) is formed by a ring member secured on the driven shaft (10).

7. A hand-held power tool according to claim 6, wherein the ring member is formed by an outer ring of a roller bearing (32).

8. A hand-held power tool according to claim 1, wherein the drive shaft (6) has, at an end (12) thereof adjacent to the driven shaft (10), a bearing peg (34) for engaging the axial stop (30) and having a cross-section smaller than a cross-section of the drive shaft (6).

9. A hand-held power tool according to claim 1, wherein the drive axis ($A_{An}$) is perpendicular to the driven axis ($A_{Ab}$).

* * * * *